United States Patent [19]

Wertz et al.

[11] Patent Number: 4,680,599
[45] Date of Patent: Jul. 14, 1987

[54] CATHODE RAY TUBE DISPLAY SYSTEM AND METHOD HAVING BIDIRECTIONAL LINE SCANNING

[75] Inventors: Ronald D. Wertz, Boulder; James H. Orszulak, Nederland; Christopher L. Sweeney, Denver, all of Colo.

[73] Assignee: Ball Corporation, Muncie, Ind.

[21] Appl. No.: 728,387

[22] Filed: Apr. 29, 1985

[51] Int. Cl.$^4$ ............................................. G09G 1/14
[52] U.S. Cl. ...................................... 340/744; 340/750
[58] Field of Search ............... 340/709, 744, 745, 750, 340/747, 748; 358/339, 140, 152, 217; 315/393; 360/48, 49

[56] References Cited

U.S. PATENT DOCUMENTS

| | | | |
|---|---|---|---|
| 2,717,329 | 9/1955 | Jones et al. | 358/133 X |
| 3,145,378 | 8/1964 | Lyons, Jr. | 340/744 X |
| 3,164,822 | 1/1965 | Uphoff | 340/744 |
| 3,662,102 | 5/1972 | Herndon | 358/83 |
| 3,757,038 | 9/1973 | Jannery et al. | 340/709 X |
| 3,938,105 | 2/1976 | Lechner | 364/900 |
| 4,203,102 | 5/1980 | Hydes | 340/750 X |
| 4,205,310 | 5/1980 | McMann, Jr. et al. | 340/750 |
| 4,491,835 | 1/1985 | Aron | 340/736 X |

Primary Examiner—Gerald L. Brigance
Assistant Examiner—Vincent Kovalick
Attorney, Agent, or Firm—Robert E. Harris

[57] ABSTRACT

A cathode ray tube display system and method having bidirectional line scanning are disclosed. Bidirectional line scanning is achieved by scanning each odd numbered scan line from left to right and each even numbered scan line from right to left, thereby avoiding the necessity for retrace, or flyback. In order to avoid loss of intelligibility in displaying the video information received from a conventional source providing video information written only from left to right, as is conventional, the received video information is stored in memory by scan lines with each odd numbered line being read out in the same order as stored in memory and each even numbered line being read out in reverse order as stored in memory. Timed control is provided for processing of the video information and display thereof with bidirectional scanning, and geometric error correction is provided for both the horizontal and vertical scan generators.

20 Claims, 1 Drawing Figure

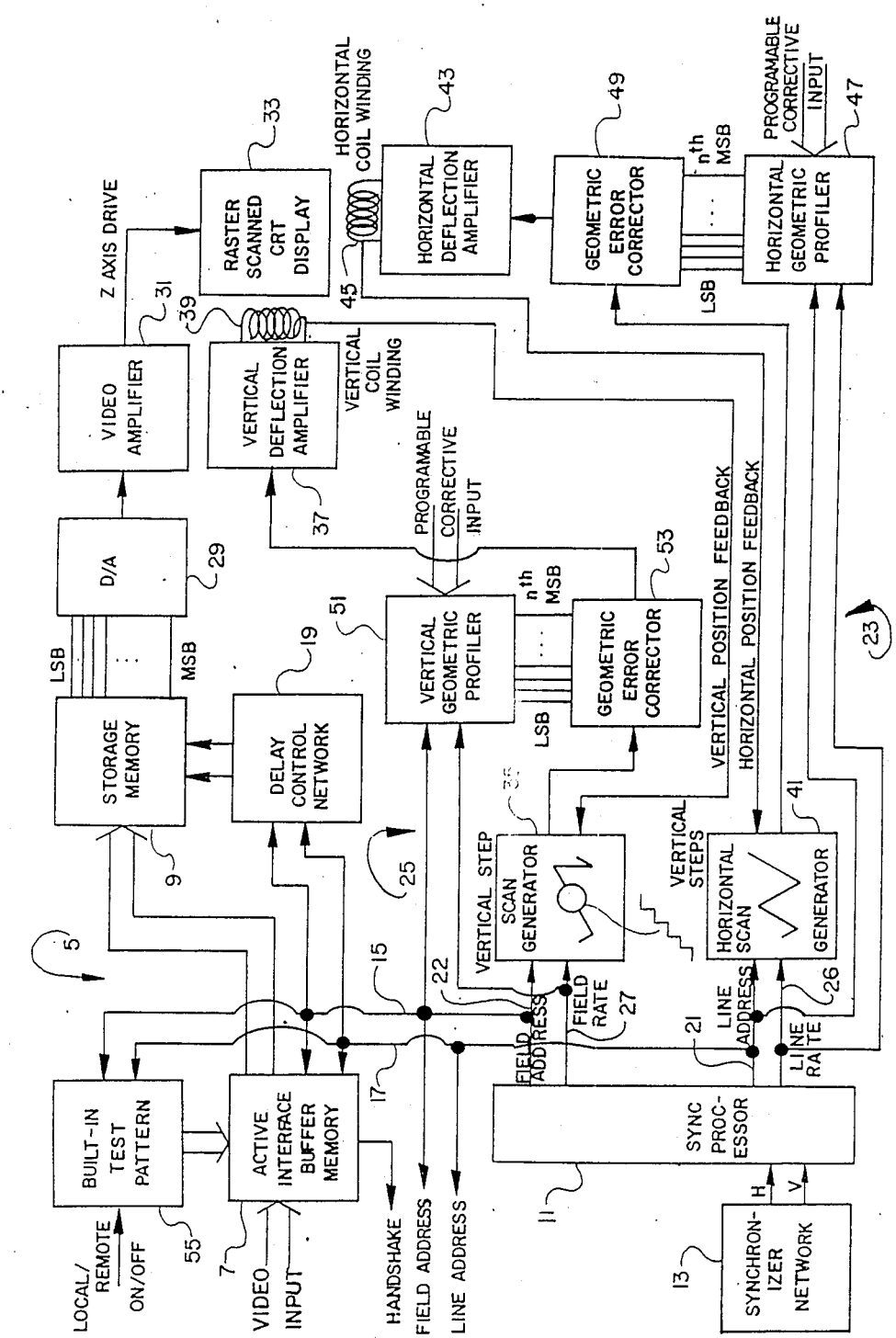

CATHODE RAY TUBE DISPLAY SYSTEM AND METHOD HAVING BIDIRECTIONAL LINE SCANNING

FIELD OF THE INVENTION

This invention relates to a cathode ray tube display system and method, and, more particularly, relates to a cathode ray tube display syste and method having bidirectional line scanning.

BACKGROUND OF THE INVENTION

Systems and methods for deflecting the electron beam of a cathode ray tube are well known in the art. Such known systems and methods, however, commonly require that flyback, or retrace, occur after each scan line.

As cathode ray tube displays have become more refined, it has been necessary that higher and higher frequencies of line rates be utilized, and such high frequency line rates have proved to be difficult to implement because of the increasing amount of power that must be dissipated in the deflection system component, a significant amount of which occurs during flyback, or retrace. It is therefore obvious that elimination of flyback, or retrace, would enhance such displays.

Bidirectional line scanning of cathode ray tube displays has been heretofore suggested, but such scanning has heretofore required that the camera supplying the video information to the cathode ray tube for display also utilize bidirectional line scanning (see, for example, U.S. Pat. No. 3,662,102 showing bidirectional horizontal line scanning. and U.S Pat. Nos. 2,717,329 and 2,817,787 showing bidirectional angular line scanning). Such systems, however, are not able to accept conventional video information and display the same utilizing bidirectional scanning without loss of intelligibility.

Memory storage by scan lines has also been heretofore suggested for use in conjunction with a display (see, for example U.S. Pat. Nos. 4,205,310 and 4,203,102), but such suggested devices have been utilized for specialized purposes and not for bidirectional scanning of alternate lines of a cathode ray tube display.

SUMMARY OF THE INVENTION

This invention provides a system and method for effecting bidirectional scanning of successive lines of a cathode ray tube without loss of intelligibility of received video information when displayed by the cathode ray tube. By utilizing bidirectional scanning, coupled with memory storage and alternating reversed readout from storage, retrace, or flyback, is eliminated, which reduces power dissipation by the deflection system, enables at least nearly doubling the line rate with respect to comparable systems where retrace is required, and enables enhancement of system performance through better linearity control utilizing active elements.

It is therefore an object of this invention to provide an improved system and method for a cathode ray tube display.

It is another object of this invention to provide an improved system and method for a cathode ray tube display utilizing bidirectional scanning.

It is still another object of this invention to provide an improved system and method for a cathode ray tube display utilizing storage memory and alternating reverse readout from storage.

It is still another object of this invention to provide an improved system and method for a cathode ray tube display having bidirectional line scanning with each odd numbered line being scanned from left to right while video information then presented is coupled to the cathode ray tube in the same order as received, and with each odd numbered line being scanned from right to left while video information then presented is coupled to the cathode ray tube in reverse order as received.

It is yet another object of this invention to provide an improved system and method for a cathode ray tube display having better linearity control utilizing active elements.

With these and other objects in view, which will become apparent to one skilled in the art as the description proceeds, this invention resides in the novel construction, combination, arrangement of parts and method substantially as hereinafter described and more particularly defined by the appended claims, it being understood that changes are meant to be included as come within the scope of the claims.

DESCRIPTION OF THE DRAWINGS

The accompanying drawing illustrates a complete embodiment of the invention according to the best mode so far devised for the practical application of the principles thereof, and in which the single figure shown is an electronic block diagram of this invention.

DESCRIPTION OF THE INVENTION

Received video information is introduced into device 5 of this invention in conventional digital format (i.e., from a source such as a camera and/or computer generated video information, for example, providing conventional left to right serial readout of each scan line).

The received video information, as shown in the drawing, is coupled to active interface buffer memory unit 7. Buffer memory unit 7 is at least a one line memory capable of receiving each scan line of received video information and coupling the same to storage memory unit 9 as a serial presentation thereto. This data base information is then latched into storage memory unit 9, which storage memory unit must have a capability of receiving and storing at least two complete scan lines so that as one line is being written into memory unit 9 from buffer unit 7, the inediately preceding line is being serially read out of memory unit 9.

Sync processor 11 is connected with synchronizer network 13 to receive horizontal and vertical synchronized pulses therefron. Sync processor 11 performs the housekeeping function of line and field addressing, and pursuant thereto, provides a field address output on lead 15 and a line address output on lead 17, both of which are coupled to buffer memory unit 7 and to delay control network 19, which network is connected to storage memory unit 9 to control the readout therefrom.

Delay control network 19 performs the function of reading out the storage memory unit in the proper order as needed (as brought out more fully hereinafter) and at the proper time with correct sequence based on the line and field addresses.

Line and field address coding is also normally sent to a user for external monitoring, manipulation, etc. (as is a hand shake output from buffer unit 7), and such line and field addressing is also coupled on leads 21 and 22 to horizontal scan deflecting circuitry 23 and vertical scan deflecting circuitry 25, respectively, which units also receive line and field rate inputs from sync processor 11 on leads 26 and 27, respectively.

Referring again to storage memory unit 9, delay control network 19 causes the first line and every other succeeding line thereafter (i.e., the odd numbered lines) occuring during each frame to be serially read out of memory unit 9 in the same order as written into memory unit 9 from buffer memory unit 7. In like manner, delay control network 19 also causes the second line and every other succeeding line thereafter (i.e., the even numbered lines) occurring during each frame to be serially read out of memory unit 9 in reverse order as written into memory unit 9 from buffer memory unit 7.

Thus, the first video line is received at buffer memory unit 7 and latched into storage memory unit 9. When the second video line is then later received at memory unit 7, this line is latched into storage memory unit 9, and during this time, the first video line is read out of memory unit 9 in the same order as written into memory unit 9.

After the second line of video is latched into memory unit 9, the third line of video is serially presented to buffer memory unit 7. In the same time sequence during which the third video line is being read out by buffer memory unit 7, the second line of video (then stored in memory unit 9) is read out of storage memory unit 9 in reverse order with respect to the order the line was written into memory unit 9 (and hence in reverse order to the readout of the first video line from memory unit 9). This procedure is then continued throughout the frame.

Each complete scan line read out from memory unit 9 is coupled through digital-to-analog (D/A) converter 29 (where utilized) and video amplifier 31 to the Z axis drive of raster scanned cathode ray tube (CRT) display 33. Amplifier 31 performs a final function of CRT-Z axis drive for beam intensity modulation. Converter 29 is utilized if the video is analog based in order to convert the incoming signal to an analog signal compatible for use as the analog input signal to a conventional raster scan cathode ray tube display. If the video is digitally based, converter 29 is not utilized and the output from storage memory unit 9 is coupled directly to amplifier 31.

Vertical scan deflecting circuitry 25 includes a vertical step scan generator 35, a vertical deflection amplifier 37, and a vertical coil winding 39, with vertical position feedback being coupled from winding 39 to vertical step scan generator 35.

Based on the field address information sent to vertical step scan generator 35, vertical deflection amplifier 37 causes the cathode ray tube to start the display of the first line of video (which is normally scanned from left to right) at the upper left hand corner of the display. Unlike standard vertical scan generators, which output a linear ramp for deflection beam scan control, the step scan generator utilized in this invention generates a step function change in the vertical deflection (as indicated in the drawing) and avoids the horizontal scan tilt normally associated with raster scan displays. The vertical scan generator is readdressed for each field line.

Horizontal scan deflecting circuitry 23 includes a horizontal scan generator 41, a horizontal deflection amplifier 43, and a horizontal coil winding 45, with horizontal position feedback being coupled from winding 45 to horizontal scan generator 41.

Horizontal scan generator 41 performs the actual bidirectional sweep task along each scan line after the beam has been addressed vertically to the top of the cathode ray tube. The positive scan slope (as indicated in the drawing) moves the beam from left to right. This scanning direction is synchronized with the presentation of each odd numbered line of video information.

In like manner, the negative scan slope (also indicated in the drawing) reverses the beam direction from right to left. The negative sweep deflection is associated with the presentation of video information on each even numbered line. This alternating horizontal scan cycle process is then repeated throughout the frame until all raster lines are displayed to the point of frame refresh.

Utilizing bidirectional scan, deflection power is conserved by utilizing energy already developed in the horizontal winding at the end of each scan line. Fast horizontal beam retrace is no longer needed, and this results in a reduction in power supply costs. Thus, deflection power is no longer lost to beam retrace and deflection components switching losses, and lower horizontal deflection supply voltage levels now result.

In addition, greater active video display time for each horizontal line period is gained since the blanking period does not have to accommodate time lost to horizontal retrace. Also, less amplifier settling is required due to the lower yoke voltage excursions and lower yoke residual delays when utilizing lower frequency operation made possible by elimination of the high retrace frequency.

Error correction is also provided for both horizontal scan deflection circuitry 23 and the vertical scan deflection scan circuitry 25. As shown in the drawing, horizontal geometric profiler 47 receives a programmable correction input and provide outputs (least significant bit to most significant bit) to geometric error corrector 49 connected between horizontal scan generator 41 and horizontal deflection amplifier 43. In like manner, vertical geometric profiler 51 receives a programmable correction input and provides outputs (least significant bit to most significant bit) to geometric error corrector 53 connected between the vertical step scan generator 35 and vertical deflection amplifier 37.

Both the horizontal and vertical error corrections are derived by measurements extrapolated from the front face of the CRT displayed pattern. Deflection non-linearity or errors are recorded to determine the deviations of the display pattern geometry from the desired geometry. This recorded deviance can then be fit to a mathematical expression or algorithm which then becomes the programmable corrective input.

The encoding of such information into digital memory can be accomplished by storage elements such as a programmable read only memory (PROM) chip. The stored data reflects the necessary corrective weighting function to be applied to the horizontal and vertical scan signals to modify the deflection, thereby providing the correct geometric profile to minimize deflection non-linearity and/or display pertibations or errors.

With a digitally based scan generation system, the geometric profilers calibrate out CRT/Yoke deficiencies for a given display to achive geometric pattern integrity patterned for each CRT display manufactured. Since the algorithms developed are made a function of the raster line and field address, the geometric profilers provide a medium to maintain display geometry performance relatively independent of the operating line and field scan rates.

Since the deflection scan horizontal and vertical generators are digitally controlled by line and field addressing, greater inherent display stability results over standard raster scan displays with positional accuracy a function of the bit resolution of the line and field incrementation. This technique of scan control allows greater flexibility for geometric error correction of combined CRT/Yoke deficiencies. With a digitally based scan generation system, horizontal and vertical geometric profilers (47 and 51, respectively) can be programmed to provide corrective weighting to the horizontal and vertical scan signals from the horizontal and vertical scan generators (41 and 35, respectively). The algorithms to correct deflection nonlinearity or deficiencies is made a function of line and field display addresses.

A built-in test pattern unit 55, governing display positional accuracy, is utilized to provide user feedback with which to manipulate the display geometric performance attributes by programmable corrective inputs to correctors 49 and 53. As shown in the drawing, test pattern unit 55 receives the field and line addresses on lines 15 and 17, respectively.

Another inherent design advantage of this invention allows an interlaced display operation to occur with superior scan registration because of less susceptibility to input signal scan noise, compared to the standard analog technique.

In operation, each complete line of video information is coupled to buffer memory unit 7 and then latched into storage memory unit 9. As the next following video line is received, the preceding line is then serially read out of storage memory unit 9 (as the next following line is being read into memory storage unit 9) and coupled through the coupling circuitry (digital-to-analog converter 29, if utilized, and video amplifier 31) to the cathode ray tube for display by modulating the beam intensity. For each odd numbered line, the readout is caused to be in the same order as written into memory unit 9, and for each even numbered line, the readout is caused to be in reverse order as written into memory unit 9.

As each odd numbered line is coupled to the cathode ray tube, the horizontal scan deflection unit is caused to deflect the beam from left to right (when the incoming video information is conventional with left to right readout of the camera originating the video information). As each even numbered line is coupled to the cathode ray tube, the horizontal scan deflection unit is caused to deflect the beam from right to left (where the incoming video information is conventional with right to left readout of the camera originating the video information).

Each line of each frame is then scanned with odd numbered lines being scanned left to right and even numbered lines being scanned from left to right, with each line being selected for scanning by the vertical step scan generator.

As can be appreciated from the foregoing, the invention provides a device and method for bidirectional scanning of a cathode ray tube display without loss of intelligibility of received video information.

What is claimed is:

1. A cathode ray tube display system having bidirectional line scanning, said system comprising:

memory means for receiving video information and storing said received information by scan lines;

coupling means connected with said memory means for coupling stored video information from said memory means by said scan lines to a cathode ray tube for display thereby;

deflection means for deflecting the beam of said cathode ray tube to thereby effect raster scanning of said cathode ray tube by individual lines and for controlling the direction of raster scanning for each scan line of said cathode ray tube so that said lines are alternately scanned in opposite directions starting with a predetermined one of said lines; and control means connected with said memory means and said deflection means so that video information coupled from said memory means through said coupling means to said cathode ray tube for display there is coupled from said memory means in the same order as received by said memory means with respect to said predetermined one of said scan lines and every other succeeding line thereafter, and is coupled from said memory means in reverse order as recieved by said memory means with respect to the line succeeding said predetermined one of said scan lines and every other succeeding line thereafter, whereby said received video information is displayed at said cathode ray tube without requiring retrace between scan lines.

2. The display system of claim 1 wherein said memory means includes a storage memory having a capability of storing at least two complete lines of video information, and a buffer memory having a capability of storing at least one complete line of video information, said buffer memory being connected to receive incoming video information and latch each complete line of such information into said storage memory.

3. The display system of claim 1 wherein said cathode ray tube accepts analog video information for creating a display, wherein said memory means includes a digital memory, and wherein said coupling means includes a digital-to-analog converter for converting the output of said digital memory to an analog signal for presentation to said cathode ray tube.

4. The display system of claim 1 wherein said deflection means is a digitally based scan generating system, and wherein said control means includes means for digitally controlling said deflection means by line and field addressing.

5. The display system of claim 1 wherein said deflection means includes a horizontal deflection means and a vertical deflection means with said horizontal deflection means being driven in opposite directions to effect said bidirectional scan of said cathode ray tube, and wherein said vertical deflection means deflects said raster scan from line to line by vertical steps to avoid horizontal scan tilt.

6. The display system of claim 1 wherein said control means includes a delay control network connected with said memory means to effect readout of said memory means in said same and reverse orders with respect to the input of said memory means, and wherein said control means includes a sync processor connected with said delay control network and said deflection means for synchronizing line scanning and coupling of video information to said cathode ray tube.

7. The display system of claim 1 wherein said system includes geometric error correction means connected with said deflecting means to cause variations in signals coupled to said deflecting means to thereby compensate for cathode ray tube difficiencies.

8. The display system of claim 1 wherein said system includes test pattern generating means connected with said memory means for displaying a test pattern on said cathode ray tube for determining display accuracy.

9. In a display system for a cathode ray tube, apparatus for effecting bidirectional scanning without loss of video information intelligibility, said apparatus comprising:
   buffer memory means for receiving complete scan lines of video information;
   storage memory means for receiving a serial presentation of each complete scan line of video information from said buffer memory means and storing the same; said storage memory means having a capacity for receiving and storing at least two complete scan lines of video information;
   coupling means connected with said storage memory means for coupling stored video information by serial readout of each scan line from said storage memory means to a cathode ray tube for display thereby;
   horizontal deflection means for deflecting the beam of said cathode ray tube along each scan line so that each odd numbered scan line is scanned from left to right and each even numbered scan line is scanned from right to left;
   vertical deflection means for deflecting the beam of said cathode ray tube between scan lines to effect a complete frame; and
   control means connected with said memory means and said deflection means so that video information read out of said storage memory means and coupled to said cathode ray tube for display thereby is read out in the same order as written into sadi storage memory means from said buffer memory means with respect to said odd numbered lines, and is read out in reverse order as written into said storage memory means from said buffer memory means with respect to said even numbered lines, whereby said received video information is displayed at said cathode ray tube without loss of intelligibility and without requiring retrace between scan lines.

10. The apparatus of claim 9 wherein said horizontal deflecting means and said vertical deflecting means include digitally based scan generators, and wherein said control means includes means for digitally controlling said horizontal deflecting means and said vertical deflecting means by line and field addressing.

11. The apparatus of claim 10 wherein said cotnrol means includes sync processor means and a delay control network connected with said sync processor means and with said storage memory means to effect said serial read out of said storage memory means in said same and reverse orders, said sync processor means also being connected with said horizontal deflecting means and said vertical deflecting means to effect said deflecting of said beam of said cathode ray tube as specified.

12. The apparatus of claim 9 wherein said apparatus includes first geometric error correction means connected with said horizontal deflecting means, second geometric error correction means connected with said vertical deflecting means, horizontal geometric profiler means connected with said first geometric error correction means, and vertical geometric profiler means connected with said second geometric error correction means whereby the signals coupled to said horizontal and vertical deflecting means are controlled as needed to effect compensation for errors in said cathode ray tube.

13. The apparatus of claim 12 wherein said apparatus includes test pattern generating means connected with said buffer memory means for displaying a test pattern on said cathode ray tube to facilitate profiling by said horizontal and vertical generator profiling means to effect error correction by said first and second geometric error correction means.

14. A cathode ray tube display system having bidirectional line scanning, said system comprising:
   input means for receiving video information to be displayed by a cathode ray tube;
   active interface buffer memory means connected with said input means to receive said video information therefrom, said buffer memory means having a capability of receiving a complete scan line of video information;
   storage memory means connected with said buffer memory means to receive a serial presentation of each said complete line of video information from said buffer storage means with each said line being latched into said storage memory means, said storage memory means having a capability of receiving at least two complete scan lines of video information in serial form from said buffer memory means;
   coupling means connected with said storage memory means for coupling stored video information by serial readout of each scan line from said storage memory means to said cathode ray tube for display thereby;
   horizontal scan generating means including a horizontal scan generator, a horizontal deflection amplifier and a horizontal coil winding for deflecting the beam of said cathode ray tube along each raster scan line of said cathode ray tube so that each odd numbered line is scanned from left to right and each even numbered line is scanned from right to left;
   vertical scan generating means including a vertical scan generator, a vertical deflection amplifier and a vertical coil winding for deflecting the beam of said cathode ray tube between raster scan lines of said cathode ray tube by steps to effect a complete frame; and
   control means including a delay control network connected with said storage memory means, a synchronizer network, and a sync processor connected with synchronizer network, said delay control network, said buffer memory means, said horizontal scan generating means, and said vertical scan generating means for controlling coupling of video information to said cathode ray tube and the occurrence of raster scanning during each scan line of said cathode ray tube so that video information read out from said storage memory means and coupled to said cathode ray tube for display thereby is read out in the same order as written into said storage memory means from said buffer memory means with respect to said odd numbered lines, and is read out in reverse order as written into said storage memory means from said buffer memory means with respect to said even numbered lines, whereby said received video information is displayed at said cathode ray tube without requiring retrace between scan lines.

15. The apparatus of claim 14 wherein said apparatus includes first geometric error correction means connected with said horizontal deflection means, second geometric error correction means connected with said vertical deflection means, horizontal geometric profiler means connected with said first geometric error correction means, vertical geometric profiler means connected with said second geometric error correction means whereby the signals coupled to said horizontal and vertical scan generating means are controlled as needed to effect compensation for errors in said cathode ray tube, and test pattern generating means connected with said buffer memory means for displaying a test pattern on said cathode ray tube to facilitate profiling by said first and second geometric profile means and correction by said first and second geometric error correction on means.

16. A method for effecting bidirectional scanning of a cathode ray tube without loss of video information intelligibility, said method comprising:

storing received video information by complete scan lines;

coupling a first predetermined one of said scan lines and every other succeeding ones of said scan lines of video information to a cathode ray tube for display thereby in the same order as stored, and, synchronously therewith, scanning a first raster scan line of said cathode ray tube and every other succeeding ones of said scan lines of video information in one predetermined direction to display said video information on said cathode ray tube; and coupling the scan line next following said predetermined one of said scan lines and every other succeeding ones of said scan lines of video information to said cathode ray tube for display thereby in reverse order as stored, and, synchronously therewith, scanning the raster scan line of said cathode ray tube next following said predetermined one of said scan lines and every other succeeding ones of said scan lines of video information in the direction opposite to said one predetermined direction to display said video information on said cathode ray tube, whereby by alternately coupling said scan lines of video information to said cathode ray tube, said scanning is accomplished bidirectionally without loss of video information intelligibility and without retrace being required.

17. The method of claim 16 wherein said step of storing received video information by complete scan lines includes storing said information in a storage memory device with said information being read into said device through a buffer storage device.

18. The method of claim 17 wherein said method includes writing a new scan line into said memory storage unit as the preceeding line is being read out of said memory storage unit and displayed at said cathode ray tube.

19. The method of claim 16 wherein said method includes choosing each odd numbered line as said first predetermined one of said scan lines and every other one of said scan lines, choosing each even numbered line as said scan line next following said first predetermined one of said scan lines and every other one of said scan lines, scanning said cathode ray tube from left to right synchronously with said odd numbered lines, and scanning said cathode ray tube from right to left synchronously with said even numbered lines.

20. The method of claim 16 wherein said method includes compensating for cathode ray tube difficiencies.

* * * * *